US010471982B2

(12) United States Patent
Tebbe et al.

(10) Patent No.: US 10,471,982 B2
(45) Date of Patent: Nov. 12, 2019

(54) STEERING COLUMN INCLUDING A PROTECTIVE COVER

(71) Applicant: FORD GLOBAL TECHNOLOGIES, LLC, Dearborn, MI (US)

(72) Inventors: Kristian Tebbe, Huerth (DE); Dirk Sickert, Bruehl (DE); Joachim Heidel, Kassel (DE); Jens Hohmann, Kaufungen (DE)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 211 days.

(21) Appl. No.: 15/613,617

(22) Filed: Jun. 5, 2017

(65) Prior Publication Data

US 2017/0267274 A1 Sep. 21, 2017

Related U.S. Application Data

(63) Continuation of application No. 14/610,866, filed on Jan. 30, 2015, now Pat. No. 9,676,407, which is a (Continued)

(30) Foreign Application Priority Data

Aug. 1, 2012 (DE) .................. 10 2012 107 023

(51) Int. Cl.
*B62D 1/20* (2006.01)
*B62D 1/16* (2006.01)
(Continued)

(52) U.S. Cl.
CPC ................ *B62D 1/20* (2013.01); *B60R 13/02* (2013.01); *B60R 21/05* (2013.01); *B62D 1/16* (2013.01); *B60R 2013/0287* (2013.01)

(58) Field of Classification Search
CPC .. B62D 1/20; B62D 1/16; B60R 21/05; B60R 13/02; B60R 2013/0287
See application file for complete search history.

(56) References Cited

U.S. PATENT DOCUMENTS 4,728,122 A 3/1988 Wright
4,826,466 A 5/1989 Triquet
(Continued)

FOREIGN PATENT DOCUMENTS

DE 10 2004 008 505 A1 9/2005
DE 10 2009 055 759 A1 5/2011
(Continued)

OTHER PUBLICATIONS

International Search Report and Written Opinion issued in International Application PCT/EP2013/066204 filed Aug. 1, 2013.
(Continued)

*Primary Examiner* — Paul N Dickson
*Assistant Examiner* — Joselynn Y Sliteris
(74) *Attorney, Agent, or Firm* — Jones Robb, PLLC; Raymond Coppiellie

(57) ABSTRACT

A steering column for a motor vehicle may include a steering spindle and a cover. The steering spindle may include an input shaft configured to rotate with a steering wheel, an output shaft rotatably mounted in a steering gear housing, and a swivel joint arranged between the shaft and the output shaft. A portion of the steering spindle within a footwell of the vehicle may be covered by the cover. The cover may include a fastening device and an opening on a side facing away from the footwell. The opening of the cover may extend across a portion of the output shaft, the swivel joint, and a portion of the input shaft. The cover may be fastened to a portion of the steering gear housing by the fastening device so the cover does not rotate with the steering spindle.

19 Claims, 4 Drawing Sheets

Related U.S. Application Data continuation of application No. PCT/EP2013/066204, filed on Aug. 1, 2013.

(51) Int. Cl.
  *B60R 13/02*   (2006.01)
  *B60R 21/05*   (2006.01)

(56) References Cited

U.S. PATENT DOCUMENTS

| | | |
|---|---|---|
| 5,695,202 A | 12/1997 | Cartwright et al. |
| 7,445,242 B2 | 11/2008 | Yamaguchi et al. |
| 8,313,120 B2 | 11/2012 | Myers |

FOREIGN PATENT DOCUMENTS

| | | |
|---|---|---|
| JP | 2010149597 A | 7/2010 |
| JP | 2005-199734 A | 5/2011 |

OTHER PUBLICATIONS

Partial machine English language translation of Written Opinion.
Non-Final Office Action dated Oct. 7, 2016, from co-pending U.S. Appl. No. 14/610,866.
Notice of Allowance dated Feb. 13, 2017, from co-pending U.S. Appl. No. 14/610,866.

STEERING COLUMN INCLUDING A PROTECTIVE COVER

CROSS REFERENCE TO RELATED APPLICATIONS

This application is a continuation of U.S. patent application Ser. No. 14/610,866, filed Jan. 30, 2015, which is a continuation of international application No. PCT/EP2013/066204, filed on Aug. 1, 2013, which claims priority to German Application No. 10 2012 107 023.7, filed on Aug. 1, 2012, the content of each of which is hereby incorporated by reference in its entirety.

TECHNICAL FIELD

The present disclosure relates to protective covers for a steering column of a motor vehicle.

BACKGROUND

Steering column covers are used to cover a swivel joint of a steering spindle located in front of a bulkhead panel of a vehicle body. Steering column covers typically have a relatively large size in order to accommodate movements of the swivel joint located within the cover, as well as movement of shafts connected to one another by the swivel joint. Due to the large size of conventional steering column covers, a space for a footwell in the vehicle is reduced, which may lead to discomfort for the driver, such as when the driver moves a foot to engage a pedal of the vehicle.

Conventional steering column covers may be improved to protect a portion of a steering column portion within a cover and also provide space for a footwell so a driver does not feel uncomfortable due to the space of the footwell.

SUMMARY

In accordance with various exemplary embodiments, the present disclosure provides a steering column for a motor vehicle comprising a steering spindle and a cover. The steering spindle comprises an input shaft configured to rotate with a steering wheel, an output shaft rotatably mounted in a steering gear housing, and a swivel joint arranged between the input shaft and the output shaft. A portion of the steering spindle within a footwell of the vehicle is covered by the cover. The cover comprises a fastening device and an opening on a side facing away from the footwell. The opening of the cover extends across a portion of the output shaft, the swivel joint, and a portion of the input shaft. The cover is fastened to the steering gear housing by the fastening device so the cover does not rotate with the steering spindle.

In accordance with various exemplary embodiments, the present disclosure further provides a steering column for a motor vehicle comprising a steering spindle, a shaft, and a cover. The steering spindle comprises an input shaft configured to rotate with a steering wheel, an output shaft rotatably mounted to a steering gear housing, a steering gear housing having a tubular shape, and a swivel joint arranged between the input shaft and the output shaft. The output shaft extends through the steering gear housing. The cover extends over a portion of the steering spindle facing a footwell of the vehicle. The cover comprises an opening on a side of the spindle facing away from the footwell when the cover is mounted on the spindle. The opening extends along an axial length of the cover. The cover comprises a fastening device that engages the steering gear housing to fasten the cover to the steering gear housing.

In accordance with various exemplary embodiments, the present disclosure further provides a steering column for a motor vehicle comprising a steering spindle and a cover. The steering spindle comprises an input shaft, an output shaft rotatably mounted in a steering gear housing, and a swivel joint connecting the input shaft and the output shaft. The cover comprises first and second ends and a body portion extending between the first and second ends. The first end is configured to be connected to the input shaft such that the input shaft is movably relative to the first end. The second end is configured to non-rotatably engage the steering gear housing. The body portion is configured to cover a portion of the spindle facing a footwell of the vehicle when mounted on the spindle.

Additional objects and advantages of the present disclosure will be set forth in part in the description which follows, and in part will be obvious from the description, or may be learned by practice of the present disclosure. Various objects and advantages of the present disclosure will be realized and attained by means of the elements and combinations particularly pointed out in the appended claims.

It is to be understood that both the foregoing general description and the following detailed description are exemplary and explanatory only and are not restrictive of the present disclosure.

The accompanying drawings, which are incorporated in and constitute a part of this specification, illustrate embodiments of the present disclosure and together with the description, serve to explain the principles of the present disclosure.

BRIEF DESCRIPTION OF THE DRAWINGS

Other advantageous details and effects of the invention are explained in detail below using an exemplary embodiment illustrated in the following figures. In the figures.

DESCRIPTION OF THE EMBODIMENTS

Figure 1:
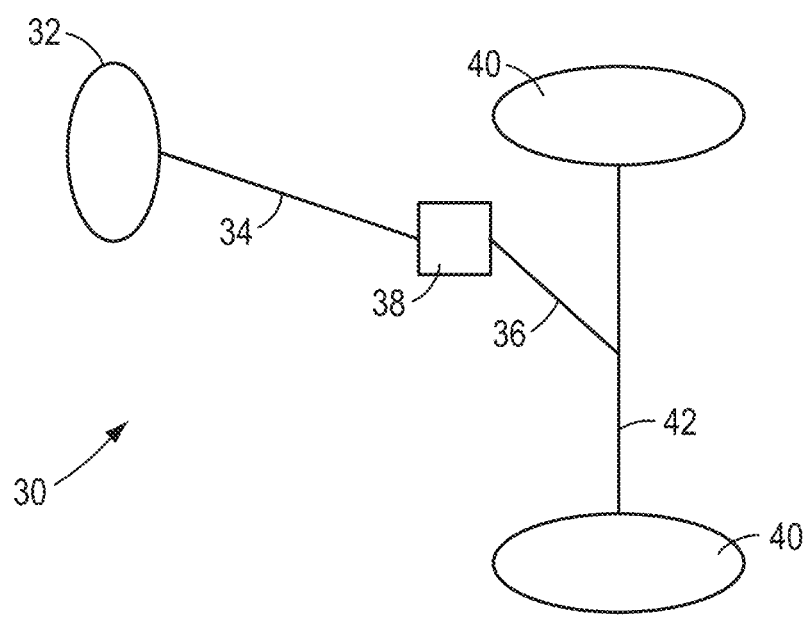
FIG. 1 schematically depicts a steering column in a vehicle, according to an exemplary embodiment in accordance with the present disclosure.

Reference will now be made in detail to various embodiments, examples of which are illustrated in the accompanying drawings. However, these various exemplary embodiments are not intended to limit the disclosure. To the contrary, the disclosure is intended to cover alternatives, modifications, and equivalents. In the drawings and the description, similar elements are provided with similar reference numerals. It is to be noted that the features explained individually in the description can be mutually combined in any technically expedient manner and disclose additional embodiments of the present disclosure.

It is to be noted that the features individually mentioned in the following description can be combined with each other in any technically meaningful manner and reveal further embodiments of the disclosure.

The various exemplary embodiments described herein contemplate steering columns including a protective cover for at least a steering spindle of the steering column, as well as motor vehicles including the steering columns with such covers. The steering column includes an input shaft configured to rotate with a steering wheel, an output shaft rotatably mounted to a steering gear housing, a bent swivel joint arranged between the input shaft and the output shaft, and a cover that covers at least the swivel joint of a steering spindle in the steering column with respect to the adjoining footwell of the motor vehicle, when the steering column is installed in the motor vehicle. Thus, the cover may provide a protective barrier with regard to a footwell of a motor vehicle, such as where a driver may place their feet during operation of the motor vehicle. As a result, a driver of the motor vehicle is protected from contacting the joint and is protected from injuries associated with contacting the joint. Further, the joint is protected from dirt that could be introduced from the footwell, which could impair operation of the joint.

According to an exemplary embodiment, the protective cover includes an opening on a side facing away from the footwell. The protective cover further includes a fastening device to fasten the cover to the steering gear housing so the protective cover does not rotate with the steering spindle, in accordance with another exemplary embodiment.

The various exemplary embodiments described herein contemplate a steering column for a motor vehicle including a protective cover having a small size so the cover uses a small space within a footwell when the column is mounted in a vehicle. As a result, an uncomfortable or crowded feeling for the driver is minimized due to the small size of the cover, mounting of the cover is facilitated, and the cover may be produced at an efficient cost. Further, the cover permits the freedom of movement of the swivel joint of a steering spindle in the column, which connects an input shaft and output shaft of the steering column. For instance, the input shaft and output shaft are rotatable and pivotable via the swivel joint.

Covers in accordance with the exemplary embodiments described herein are configured to be relatively small in size and are further configured to be fastened to the column to permit movements of the shafts via the swivel joint. Therefore, not only do the covers of the exemplary embodiments described herein have a small overall size, which facilitates efficient manufacture, such as by using less material, the cover also balances the consideration of being connected to a steering column in a manner that does not interfere with movements of the swivel joint. For example, the cover is constructed to leave a small space for possible movements of the swivel joint.

According to an exemplary embodiment, the cover is connected in a non-rotatable manner to a steering gear housing for the output shaft. For example, the cover is connected to the steering gear housing via a fastening device so a shaft (e.g., the output shaft) is rotatably mounted in the steering gear housing but the cover does not rotate with the shaft. Further, the shaft may be mounted in the steering gear housing so the shaft (e.g., the output shaft) does not pivot relative to the steering gear housing. At least part of the steering gear housing can extend through a bulkhead panel of a body of a motor vehicle and into the passenger compartment (e.g., footwell). This part of the steering gear housing can be a fixed extension or a separate attachment of the steering gear housing, such as separate attachment 25 of steering gear housing 9 shown in FIG. 2. For example, the part of the steering gear housing can be rigidly arranged relative to a remainder of the steering gear housing during the operation of the steering column. Further, a seal for the steering spindle relative to a bulkhead wall of the motor vehicle can be formed between the steering gear housing and the bulkhead panel on the engine-compartment side.

The protective cover of the steering column has a protective shell or housing, according to an exemplary embodiment. For example, the shell extends along the steering spindle from a region of the output shaft, across the swivel joint, and into a region of the input shaft of the steering column. The protective shell of the cover thus may cover the steering spindle with respect to a side of the steering spindle that faces a footwell of the vehicle. The protective shell may be open on the side of the spindle facing away from the footwell. Due to the open design of the shell (e.g., having one side open, such as on the side facing away from the footwell), mounting of the protective cover is facilitated because the cover can simply be placed on the steering spindle and fastened to the steering spindle, such as via a fastening device. In this case, the open configuration of the protective shell can be of any desired configuration. For example, the shell may have a continuous slot along the steering spindle (e.g., along a length of the shell).

According to an exemplary embodiment, the protective cover is fastened by a fastening device to the steering gear housing in which the output shaft of the steering column is rotatably mounted. Thus, the protective cover is not fastened to the steering spindle itself. Instead, the output shaft is mounted in such a way as to be rotatable relative to the protective cover. As a result, rotation transmitted to the input shaft via a steering wheel of the motor vehicle, to which the input shaft is connected for conjoint rotation, is in turn transmitted to the output shaft in a manner unhindered by the cover, despite the cover shielding the swivel joint of the steering spindle of the steering column. Pivoting movements of the input shaft relative to the output shaft via the swivel joint typically do not involve relatively large angles and are therefore unhindered if the shell of the protective cover extends at a small distance from the input shaft (e.g., provides a small clearance between the shell and the input shaft). For example, a distance between the protective shell and the input shaft may be larger than a minimum distance between the cover and the output shaft or the swivel joint.

The protective cover can have various shapes. For example, the shell of the protective cover can extend in a substantially straight line along the steering spindle. According to an exemplary embodiment, the shell has a bent (e.g., angled) shape to accommodate the alignment of the input shaft and the output shaft. For example, the input shaft and the output shaft may be aligned with one another at a deflection angle via the swivel joint of the steering spindle and the bent shape of the shell accommodates this alignment. Further, because the shafts can also pivot relative to one another via the swivel joint, the direction of deflection of the swivel joint is variable. In view of this, the protective shell can have a curved shape, according to one exemplary embodiment. For example, the shell may have a curvature corresponding to a deflection curve defined by the direction of deflection of the swivel joint.

The fastening device used to fasten the protective cover to the steering gear housing can have various configurations. For example, the fastening device can be designed as a permanent adhesive joint. In another example, the cover is detachably fastened to the steering gear housing by the fastening device so that the cover is removable for repair and/or maintenance work. According to an exemplary embodiment, the fastening device is clamping joint with a separate clamping element that can be detachably fastened to the steering gear housing. For instance, the fastening device may include a latching element to facilitate a connection between the cover and the steering column.

The steering gear housing can include a counter contour (or a complementary contour) that matches/fits in a complementary manner a contour of the latching element in such a way that, after being latched onto the steering gear housing, the latching element is moved into a position predetermined by the contour and/or counter contour (complementary contour) and the cover is held in position by positive engagement both along the length of the steering spindle (e.g., an axial direction) and also radially with respect to the steering spindle. The fastening of the protective cover in one or both of the axial and radial directions can also result from a static friction between the fastening device and the steering gear housing. Thus, the various exemplary embodiments described herein contemplate a protective cover that is neither rotatable nor slidable relative to the steering gear housing. According to an exemplary embodiment, a surface of the fastening device that contacts on the steering gear housing can be coated with a material to optimize the friction properties of the fastening device and facilitate positioning of the cover relative to the steering gear housing (i.e., maximizing the friction properties will reduce and/or prevent movement of the fastening device, and thus the cover, relative to the steering gear housing).

According to an exemplary embodiment, the latching element of the fastening device can be designed as a partial ring that can be latched onto the steering gear housing in a radial direction about the steering gear housing. For example, the steering gear housing may include a fastening groove having a shape that corresponds to a shape of the partial ring to facilitate simple mounting of the cover. To mount the protective cover, the cover can be placed against the steering gear housing, such that the cover exerts a force in a radial direction with respect to a longitudinal axis of the protective cover. Thus, the latching element can then be inserted into the corresponding fastening groove of the steering gear housing. In this way, the protective cover can be moved into its desired position to fasten the cover so the steering spindle is covered with respect to the footwell of the motor vehicle, such as when the steering spindle and all the other parts of the steering column have already been fully mounted in the vehicle.

According to an exemplary embodiment, the protective cover includes a connection device to connect the cover to the input shaft of the steering column. The connection device may be located at an end of the cover opposite to the fastening device for fastening the cover to the steering gear housing. Thus, the connection device provides a structure to retain the protective cover in place and stabilize the location of the cover relative to the steering spindle, which minimizes or prevents loss of the cover. The connection device is configured to not interfere with or restrict the rotation of the steering spindle. Further, the connection device facilitates cover of the swivel joint in a direction of the input shaft of the steering spindle.

To connect the protective cover to the input shaft, the connection device can partially surround the input shaft. For example, the connection device surrounds the input shaft with a clearance, with the result that the input shaft is rotatably mounted within the protective cover. According to an exemplary embodiment, the connection device at least partially surrounds the input shaft with a clearance that is greater in the direction of deflection of the swivel joint, due to deflection of the input shaft relative to the output shaft, than in a direction transverse to the direction of deflection. A small amount of clearance is sufficient in the direction transverse to the direction of deflection because the clearance must merely provide space for rotation of the input shaft and there is little to no deflection along the transverse direction. With respect to the direction of deflection, the connection device provides clearance for pivoting of the input shaft relative to the output shaft. According to an exemplary embodiment, the clearance relative to the input shaft in the direction of deflection is about 10% to about 30% greater than in a direction transverse to the direction of deflection. According to an exemplary embodiment, the clearance relative to the input shaft in the direction of deflection is about 20% greater than in a direction transverse to the direction of deflection. For example, the connection device can include an aperture through which the input shaft extends such that the connection device at least partially surrounds the input shaft, with the aperture having a non-round shape. For instance, the aperture may have an oval shape, such as an oval partial ring, the maximum radius of which lies in the direction of deflection.

The steering column can be manufactured from various materials. For example, the steering column may be made using materials such as steel, fiber-reinforced plastics, and other materials familiar to one skilled in the art. The protective cover may be rigid. According to an exemplary embodiment, the protective cover is manufactured to have a single-piece construction. For example, the cover and the fastening device may be made with a single-piece construction. Further, the cover, the fastening device, and the connection device may have a single-piece construction. For example, the protective cover can be manufactured as a single-piece plastic molding. In order to achieve different elasticities, e.g., a higher elasticity in the region of the protective shell and, if appropriate, in the region of the connection device, than in the region of the fastening device, the protective cover can be designed with varying wall thicknesses. However, the protective cover also can be designed with a constant wall thickness and be made from just one material. The various exemplary embodiments described herein also contemplate covers made from various pieces, which may be made from different materials, such as via a two-component technique or techniques using more than two components. For example, any of the cover, the fastening device, and the connection device may be provided as a separate piece, which can be made from a different material than other pieces.

Due to its positioning with respect to a footwell of a motor vehicle to cover a steering spindle of a steering column to shield the spindle and protect a driver from contacting the spindle, the cover may serve as a crash pad. Thus, the cover may facilitate cushioning of the driver during an accident and/or provide a degree of penetration resistance against components piercing the cover, according to an exemplary embodiment.

Turning now to the drawings, FIG. 1 illustrates an exemplary embodiment of a steering column 30 in a vehicle. Steering column 30 includes an input shaft 34 coupled to a steering wheel 32, an output shaft 36, and a swivel joint 38 connecting the input shaft 34 and the output shaft 36. The output shaft 36 may be connected to an axle 42, such as via other steering components not shown in the schematic depiction of FIG. 1. Wheels 40 are coupled to axle 42 so that a driver may turn the steering wheel 32, causing input shaft 34 and output shaft 36 to rotate, via the connection provided by joint 38, which in turn causes wheels 40 to turn.

Figure 2:
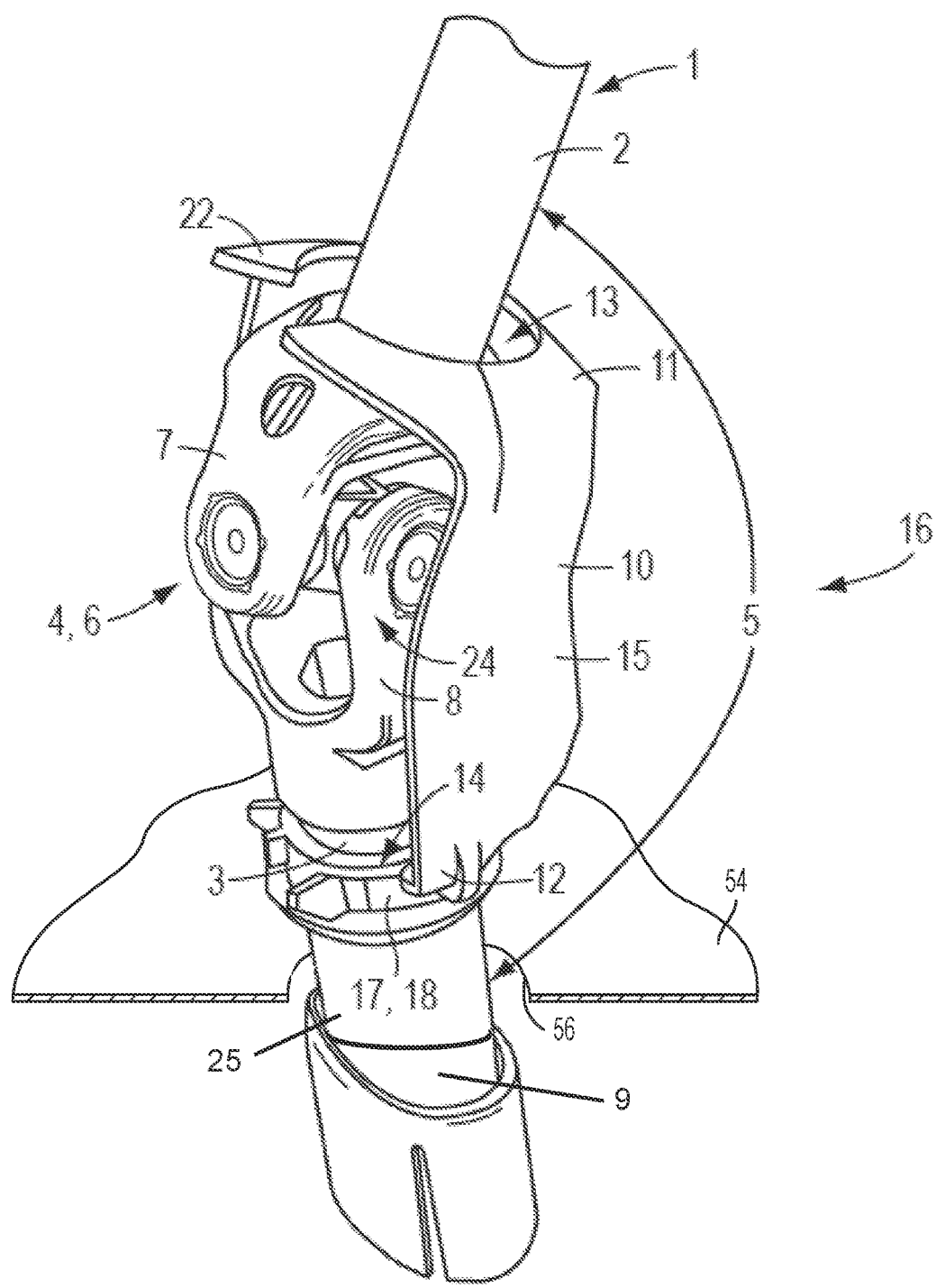
FIG. 2 depicts a portion of a steering column with a mounted cover, according to an exemplary embodiment.

FIG. 2 shows an exemplary embodiment of a steering spindle of a steering column for a motor vehicle. Steering spindle 1 includes an input shaft 2 and an output shaft 3 that are rotatably and pivotably connected to one another via a swivel joint 4. Shafts 2, 3 are pivotable relative to one another via swivel joint 4, such as along the direction of deflection 5 depicted in FIG. 2. According to an exemplary embodiment, swivel joint 4 is configured as a Cardan joint 6 including two associated yokes 7, 8. Output shaft 3 is rotatably mounted in a steering gear housing 9, as depicted in FIG. 2. Therefore, as output shaft 3 pivots relative to input shaft 2, the steering gear housing 9 pivots with the output shaft 3. Steering gear housing 9 may have a tubular shape through which output shaft 3 extends, as depicted in the exemplary embodiment of FIG. 2.

As depicted in FIG. 2, at least the swivel joint 4 of the steering column is covered by a protective cover 10. Cover 10 includes apertures 13, 14 at respective end regions 11, 12 of cover 10, from which the input shaft 2 and the output shaft 3 emerge from the region of the steering spindle 1 covered by the protective cover 10. A shell 15 (e.g., housing) of the protective cover 10 may extend from end region 12, which may at least partially extend around the output shaft 3, across the swivel joint 4, and into end region 11, which may at least partially extend around the input shaft 2. According to an exemplary embodiment, shell 15 has a curved shape that corresponds to the arrangement of the input shaft 2 and of the output shaft 3. For instance, shell 15 may have a shape that curves in a manner corresponding to a deflection curve defined by the direction of deflection between input shaft 2 and output shaft at the swivel joint 4.

Figure 3:
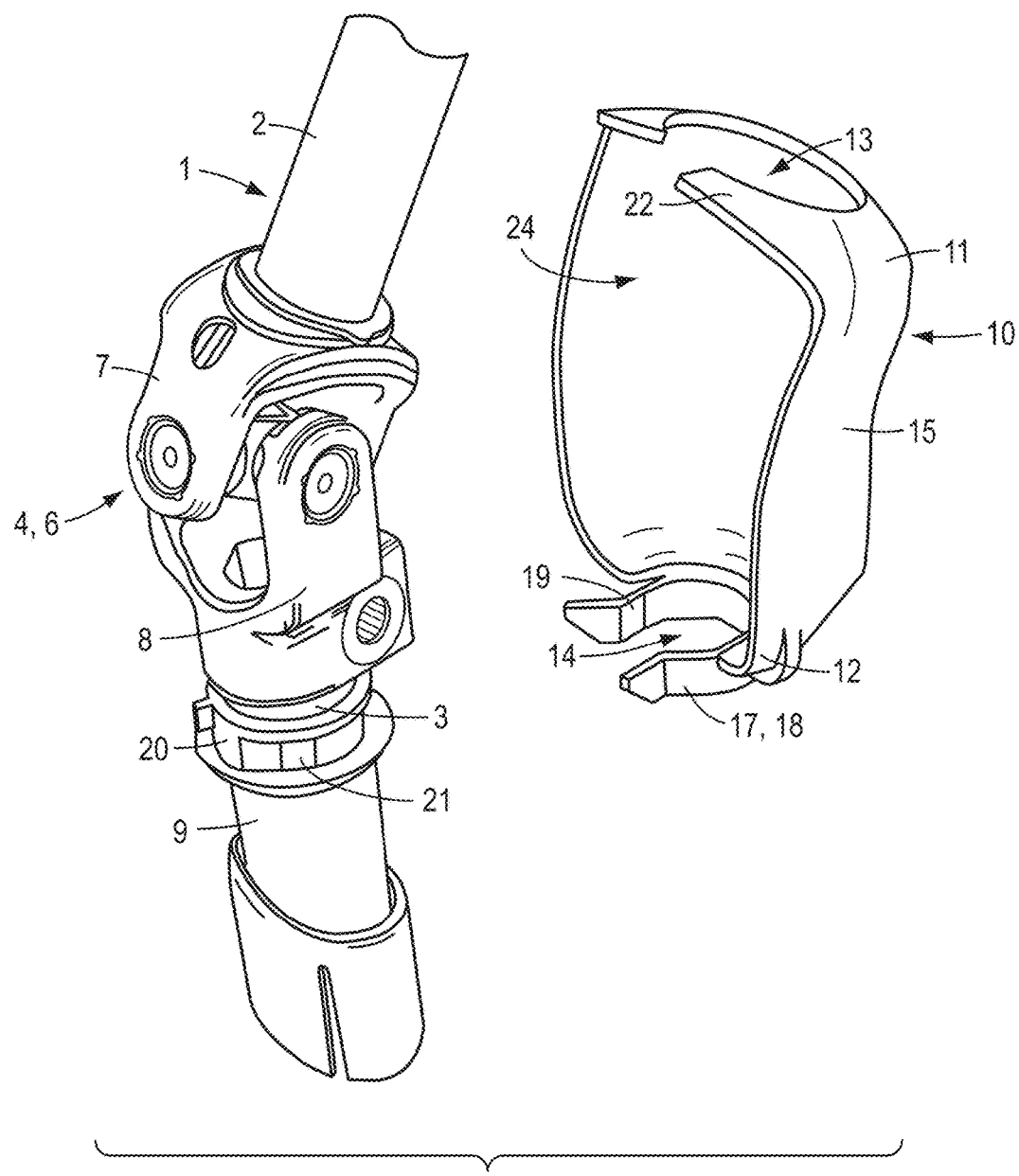
FIG. 3 depicts the steering column portion of FIG. 2 with the cover removed from the steering column.

According to an exemplary embodiment, the shell 15 may have a configuration in which the shell 15 is open on one side. For example, shell 15 may include an opening 24 so cover 10 is open on one side, as shown in FIG. 3. Shell 15 may be configured so the opening 24 is position to be on the side of the spindle 1 facing away from a footwell 16 of a motor vehicle in a position of the cover 10 being installed on the spindle 1 in a motor vehicle 1, as shown in FIG. 2. Due to the open design of the shell 15 (e.g., having one side open due to opening 24, such as on the side facing away from the footwell 16), mounting of the protective cover 10 is facilitated because the cover 10 can simply be placed on and fastened to the steering spindle 1. Nevertheless, the swivel joint 4 is shielded by the protective shell 15 from footwell 16. Opening 24 may extend between apertures 13, 14 in the end regions 11, 12 of cover 10 and may merge with apertures 13, 14, as shown in FIG. 3.

Cover 10 may be connected to the output shaft 3 of the steering spindle by fastening the cover 10 to the steering gear housing 9. According to an exemplary embodiment, cover 10 includes a fastening device 17 configured to nonrotatably attach cover 10 to the steering gear housing 9. As depicted in the exemplary embodiment of FIGS. 2 and 3, fastening device 17 may include a partial ring 18, which may latch about steering gear housing 9 in a radial direction. As shown in FIG. 3, the partial ring 18 may have a contour 19 having a shape corresponding to a shape of a fastening groove 20 of the steering gear housing 9. The fastening groove 20 may include a counter contour 21 (a contour complementary to the contour of the ring 18 of fastening device 17) to facilitate positive latching of the fastening device 17 to the steering gear housing 9, as shown in FIG. 3. The use of the contour of ring 18 and counter contour 21 results in a fixed connection between the end of the cover 10 and the steering gear housing 9, such that the cover is not rotatable relative to the steering gear housing 9. Although the connection is described as fixed, the connection may be permanent, or may be releasable. As a result, the protective cover 10 can be mounted on an already fully assembled steering spindle 1 in a simple manner by latching the protective cover 10 into the fastening groove 20 of the steering gear housing 9. Due to the contour 19 and the counter contour 21, the protective cover 10 may be automatically arranged in a defined position relative to the steering spindle 1 when the fastening device 17 is latched to the fastening groove 20.

Cover 10 also includes a connection device 22 to connect the cover 10 to the input shaft 2, in accordance with the present teachings. For example, end aperture 13 may have a non-round shape and may at least partially surround the input shaft 2 while providing a clearance between the input shaft 2 and the cover 10 to accommodate movements of the input shaft 2. According to one exemplary embodiment, aperture 13 has an oval design, although the various exemplary embodiments described herein contemplate apertures with other non-round shapes. Thus, cover 10 may be connected to input shaft to minimize or prevent detachment and loss of the cover 10, while permitting input shaft 2 to move freely relative to the cover 10 and output shaft 3 via joint 4.

Figure 4:
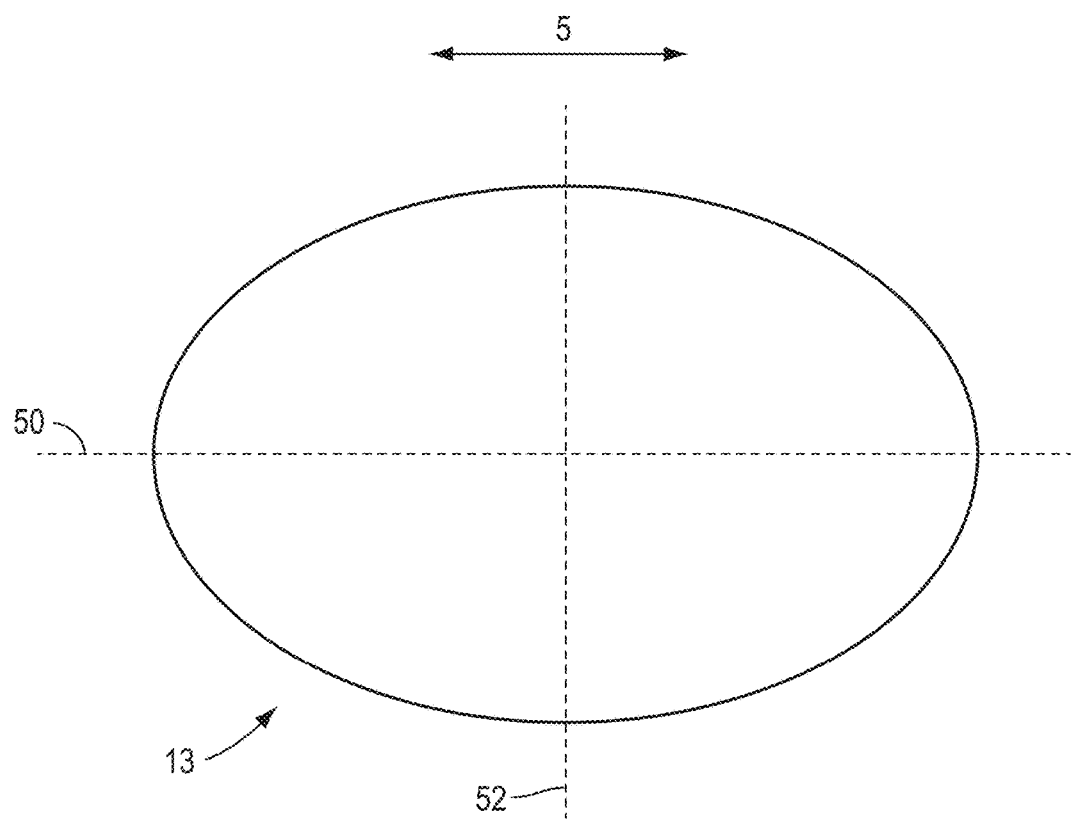
FIG. 4 depicts an end view of an aperture of the cover of FIGS. 2 and 3.

Because input shaft 2 may pivot relative to output shaft 3 along the direction of deflection 5 via swivel joint 4, aperture 13 may be shaped to accommodate the pivoting movement of the input shaft 2. For example, as depicted in the exemplary embodiment of FIG. 4, aperture 13 may have a non-round shape that extends to a greater extent along the direction of deflection 5 than in a direction transverse to the direction of deflection 5. That is, the input shaft 2 may travel along a major axis 50 of the non-round shape during movement (e.g., deflection) relative to output shaft 3. Additionally or alternatively, the input shaft 2 may travel in a direction of a plane in which the major axis 50 of the non-round shape extends when traveling in along direction of the angle of deflection 5. Thus, aperture 13 provides a greater clearance between cover 10 and input shaft 2 along the direction of deflection 5 (e.g., along major axis 50) than in a direction transverse to the direction of deflection 5 (e.g., along minor axis 52). Although aperture 13 is depicted in the exemplary embodiment of FIG. 4 as being a closed opening (e.g., a complete non-round shape, such as a complete oval), aperture 13 may have other shapes, such as an open, non-round shape, as depicted in FIGS. 2 and 3. Further, aperture 13 is not limited to the oval shape depicted in the exemplary embodiment of FIG. 4 and may have other non-round shapes contemplated by the present teachings.

According to an exemplary embodiment, the clearance relative to the input shaft 2 in the direction of deflection 5 (e.g., along major axis 50) is about 10% to about 30% greater than in a direction transverse to the direction of deflection 5 (e.g., along minor axis 52). According to an exemplary embodiment, the clearance relative to the input shaft 2 in the direction of deflection 5 is about 20% greater than in a direction transverse to the direction of deflection 5. As illustrated in FIG. 3, aperture 13 and connection device 22 may not be physically connected to input shaft 2, rather aperture 13 may partially encompass or surround input shaft 2, such that input shaft 2 is movable relative to cover 10 and aperture 13 and connection device 22, such as along the direction of deflection 5.

According to an exemplary embodiment, aperture 13 has an oval shape with a major axis (e.g., major axis 50 of FIG. 4) of the oval lying along the direction of travel of the input shaft 2 when moving in a direction of deflection 5. As a result, aperture 13 provides sufficient space (e.g., clearance between cover 10 and input shaft 2) to accommodate the pivoting motion of the input shaft 2 relative to cover 10 while providing a connection between the cover 10 and input shaft 2. Thus, the protective cover 10 covers the swivel joint 4 without restricting relative movements of the shafts 2, 3 connected by the swivel joint 4. The pivoting movement, in turn, can be attributed to a movement of the steering gear housing 9 relative to the input shaft 2.

In the case of a motor vehicle equipped with a steering column according to the various exemplary embodiments described herein, a part of the steering gear housing 9 including the fastening groove 20 may project through a bulkhead panel 54 of a body of the vehicle and into a footwell 16 of the vehicle. The bulkhead 54 may include an opening 56 corresponding to maximum movements of the steering gear housing 9 relative to the body, which occur during the operation of the motor vehicle. The passage for the steering spindle 1 through the bulkhead 54 can be sealed by a bellows and/or a flexible shield (not shown), for example, between the bulkhead 54 and the steering gear housing 9 on the engine-compartment side.

Further modifications and alternative embodiments will be apparent to those of ordinary skill in the art in view of the disclosure herein. For example, the systems and the methods may include additional components or steps that were omitted from the diagrams and description for clarity of operation. Accordingly, this description is to be construed as illustrative only and is for the purpose of teaching those skilled in the art the general manner of carrying out the present teachings. It is to be understood that the various embodiments shown and described herein are to be taken as exemplary. Elements and materials, and arrangements of those elements and materials, may be substituted for those illustrated and described herein, parts and processes may be reversed, and certain features of the present teachings may be utilized independently, all as would be apparent to one skilled in the art after having the benefit of the description herein. Changes may be made in the elements described herein without departing from the spirit and scope of the present teachings and following claims.

This description and the accompanying drawing that illustrates exemplary embodiments of the present teachings should not be taken as limiting. Various mechanical, compositional, structural, electrical, and operational changes may be made without departing from the scope of this description and the claims, including equivalents. In some instances, well-known structures and techniques have not been shown or described in detail so as not to obscure the disclosure. Like numbers in two or more figures represent the same or similar elements. Furthermore, elements and their associated features that are described in detail with reference to one embodiment may, whenever practical, be included in other embodiments in which they are not specifically shown or described. For example, if an element is described in detail with reference to one embodiment and is not described with reference to a second embodiment, the element may nevertheless be claimed as included in the second embodiment.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the written description and claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

It is noted that, as used in this specification and the appended claims, the singular forms "a," "an," and "the," include plural referents unless expressly and unequivocally limited to one referent. Thus, for example, reference to "a sensor" includes two or more different sensors. As used herein, the term "include" and its grammatical variants are intended to be non-limiting, such that recitation of items in a list is not to the exclusion of other like items that can be substituted or added to the listed items.

It will be apparent to those skilled in the art that various modifications and variations can be made to the system and method of the present disclosure without departing from the scope its disclosure. It is to be understood that the particular examples and embodiments set forth herein are non-limiting, and modifications to structure, dimensions, materials, and methodologies may be made without departing from the scope of the present teachings. Other embodiments of the disclosure will be apparent to those skilled in the art from consideration of the specification and practice of the disclosure disclosed herein. It is intended that the specification and embodiment described herein be considered as exemplary only.

What is claimed is:

1. A motor vehicle, comprising:
   a steering shaft comprising:
      an input shaft;
      an output shaft rotatably mounted in a steering gear housing; and
      a swivel joint arranged between the input shaft and the output shaft; and
   a cover positioned over a portion of the steering shaft within a footwell of the motor vehicle, the cover being fastened to a portion of the steering gear housing, wherein the portion of the steering gear housing to which the cover is fastened extends through a bulkhead and into the footwell of the motor vehicle.

2. The motor vehicle of claim 1, wherein the portion of the steering gear housing to which the cover is fastened comprises a separate component attached to the steering gear housing.

3. The motor vehicle of claim 1, wherein the portion of the steering gear housing to which the cover is fastened comprises an extension of the steering gear housing.

4. The motor vehicle of claim 1, wherein the input shaft is attached to a steering wheel.

5. A steering column for a motor vehicle, comprising:
   an input shaft;
   an output shaft rotatably mounted to a steering gear housing;
   a swivel joint between the input shaft and the output shaft; and
   a cover extending over a portion of an axial length of the swivel joint, the cover comprising an opening extending along an axial length of the cover, wherein the cover is coupled to a portion of the steering gear housing.

6. The steering column of claim 5, wherein the cover comprises a partial ring through which the output shaft extends.

7. The steering column of claim 5, wherein the cover comprises an aperture through which the input shaft extends, wherein the aperture provides a clearance between the input shaft and the cover that is greater in a direction of deflection of the swivel joint than in a direction transverse to the direction of deflection.

8. The steering column as claimed in claim 7, wherein the aperture has a non-round shape having a greater diameter in the direction of deflection than in the direction transverse to the direction of deflection.

9. The steering column as claimed in claim 5, wherein the cover comprises a rigid shell.

10. The steering column as claimed in claim 5, wherein the cover comprises a shell having a single-piece construction.

11. The steering column as claimed in claim 5, wherein the cover is fastened to the portion of the steering gear housing by a fastening device so the cover does not rotate with the input shaft, the output shaft, or the swivel joint.

12. The steering column of claim 5, wherein the portion of the steering gear housing comprises a separate component attached to the steering gear housing.

13. A steering column for a motor vehicle, comprising:
 a steering spindle comprising:
  an input shaft, an output shaft rotatably mounted in a steering gear housing, and a swivel joint connecting the input shaft and the output shaft; and
 a cover comprising a body portion extending between first and second ends,
 wherein:
  the first end is configured to be connected to the input shaft, the input shaft being movable relative to the first end,
  the second end is configured to non-rotatably engage a portion of the steering gear housing,
  the body portion is configured to cover a portion of the steering spindle facing a footwell of the motor vehicle when the cover is mounted on the steering spindle and the steering spindle is mounted in the motor vehicle, and
  the body portion of the cover further comprises an opening extending from the first end to the second end and configured to be positioned on a side of the steering spindle facing away from the footwell when the cover is mounted on the steering spindle in the motor vehicle.

14. The steering column as claimed in claim 13, wherein the body portion comprises a shell having a single-piece construction.

15. The steering column as claimed in claim 13, wherein the first end comprises a first aperture configured to receive the input shaft.

16. The steering column as claimed in claim 15, wherein the second end comprises a second aperture configured to engage a groove on the portion of the steering gear housing.

17. The steering column as claimed in claim 16, wherein a contour of the second aperture is complementary to a contour of the groove.

18. The steering column of claim 13, wherein the portion of the steering gear housing comprises a separate component attached to the steering gear housing.

19. The steering column of claim 13, wherein the portion of the steering gear housing comprises an extension of the steering gear housing.

* * * * *